United States Patent [19]

Jaspon

[11] 4,337,322
[45] Jun. 29, 1982

[54] TIRE FILLING COMPOSITION

[76] Inventor: Lawrence E. Jaspon, 15 Lovers La., Southboro, Mass. 01772

[21] Appl. No.: 300,210

[22] Filed: Sep. 8, 1981

[51] Int. Cl.$^3$ .............................................. C08L 9/10
[52] U.S. Cl. ..................................... 523/166; 524/376
[58] Field of Search .................... 260/23.7 A, 23.7 M, 260/29.7 GP, 29.7 E, 746

[56] References Cited

U.S. PATENT DOCUMENTS 3,706,696 12/1972 Bernett ............................ 260/29.7 E
3,838,085 9/1974 Myers ............................ 260/23.7 A Primary Examiner—Paul R. Michl
Attorney, Agent, or Firm—Blodgett & Blodgett

[57] ABSTRACT

A fibrous liquid composition for use in automobile tires to provide sealing, heat-transfer, and wheel balancing. The formula includes asbestos, ethylene glycol monomer, polyethylene glycol, polyisoprene, process oil, detergent, sodium bicarbonate, and water.

11 Claims, No Drawings

TIRE FILLING COMPOSITION

BACKGROUND OF THE INVENTION

The high cost of automobile tires justifies considerable effort in extending the useful life of the tires. A major cause for the reduction in tire life is under-inflation of the tire as a result of slow leaks. Another cause of shortened tire life is increased rolling resistance caused by out-of-balance tires. Furthermore, excess heat generated by the above two factors and other driving conditions can considerably reduce the life of a tire. Another aspect of present tire use involves the dangers associated with leaks caused by puncturing of the tire. A flat tire can be extremely dangerous if it occurs during operation on high speed highways. Direct dangers associated with changing a flat tire under highway conditions are well known. Equally well known are the indirect dangers associated with being stranded on the side of a highway, including collision with moving traffic and physical violence intentionally inflicted on helpless stranded drivers by criminals. Thus, the shortcoming of automobile tires do not only become an economic problem, but also can contribute significantly to the physical danger associated with automobile operation. These and other difficulties experienced with the prior art have been obviated in a novel manner by the present invention.

It is, therefore, an outstanding object of the invention to provide an automobile tire filling composition which provides continued sealing of slow leaks and thereby helps to maintain proper tire pressure and thereby to extend tire life.

Another object of this invention is the provision of an automobile tire filling composition which continuously assists in maintaining proper tire balance and thereby extends tire life.

A further object of the present invention is the provision of an automobile tire filling composition which assists the transfer of heat from the tire body and thereby extends the life of the tire.

It is another object of the instant invention to provide an automobile tire filling composition which seals around an object which punctures a tire, the composition thereby preventing highway leaks.

A still further object of the invention is the provision of an automobile tire filling composition which actually seals the opening remaining when a puncturing object is removed from an automobile tire.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

This invention is a composition for injection into inflated automobile tires. The composition is a liquid containing a fibrous component. About eight ounces is added to the standard auto tire. The composition provides long-term sealing of slow leaks, continuous wheel balancing of the tire, transfer of heat away from the tire body, and sealing of punctions in the tire before and after the puncturing object is removed. The composition includes asbestos fiber, ethylene glycol monomer, polyethylene glycol, polyisoprene, process oil, detergent, sodium bicarbonate and water.

DESCRIPTION OF THE PREFERRED EMBODIMENT

The following basic formula is suitable for use in the tires of conventional automobiles operated on paved road situations.

5 pounds asbestos
1 gallon ethylene glycol
1 gallon polyethylene glycol
2 pounds polyisoprene (natural laytex, uncured)
1 pint process oil
1 pint detergent
$\frac{1}{2}$ pound sodium bicarbonate add water to make $2\frac{1}{2}$ gallons.

The asbestos is grade 4 T with a length of one cm. ±0.5 cm. The ethylene glycol is industrial grade 2. The polyethylene glycol has an average molecular weight of 200 and is in the range of 190 to 210. The polyisoprene is in the form "Natural Laytex Rubber," namely natural uncrosslinked poly-cis-1,4-polyisoprene at 62% solid by weight in an ammonium hydroxide carrier with pH of 10.5. The process oil is any technical process oil such as Wesson vegetable oil. The detergent is any liquid detergent such as Joy household dishwashing detergent.

It has been found that the addition of about 2 ouncesCS of 50% ethyl zymate slurry in water to the $2\frac{1}{2}$ gallon batch significantly increases the shelf life of the composition.

The basic formula is rendered more effective for high speed commercial vehicles by adding 20% more asbestos, 10% more isoprene, and 20% less detergent.

The basic formula is rendered more effective for off-the-road use by adding 50% more asbestos and 50% less isoprene.

Thus, in a two and one half gallon batch, the asbestos may be present between 5 to $7\frac{1}{2}$ pounds, the isoprene may be present between one and 2.2 pounds, and the detergent may be present between 0.8 to one pint.

The mixing of the composition must be accomplished as follows: The asbestos is mixed with sufficient water that the asbestos is completely wetted. Then the oil is added and mixed in. Next the detergent is added and mixed in to hold the oil and water in suspension. Next, the ethylene glycol and polyethylene glycol are added and mixed in. An exothermic reaction occurs and the batch must stand until the temperature has leveled off. Then the baking soda is added and mixed in. Finally, the isoprene is mixed in and the remaining water is added.

The composition can be pumped into a tire while the tire is on a vehicle and inflated. The valve core is removed and the output nozzle of a high-pressure fluid pump is quickly connected to the valve. Approximately 8 ounces of composition is pumped into a standard automobile tire. The composition is found to be effective for the life of the tire.

While it will be apparent that the illustrated embodiments of the invention herein disclosed are well calculated adequately to fulfill the objects and advantages primarily stated, it is to be understood that the invention is susceptible to variation, modification, and change within the spirit and scope of the sub-joined claims.

The invention having been thus described, what is claimed as new and desired to secure by Letters Patent is:

1. A composition for injection into inflatable tires, the composition comprising:
   (a) asbestos fiber,
   (b) ethylene glycol monomer,
   (c) polyethylene glycol,
   (d) polyisoprene,
   (e) process oil,
   (f) detergent,
   (g) sodium bicarbonate, and
   (h) water 2. A composition as recited in claim 1, wherein the asbestos is present at a rate of five to seven-and-one-half pounds per two and one-half gallons of composition.

3. A composition as recited in claim 1, wherein the ethylene glycol monomer is present at a concentration of one gallon per two and one-half gallons of composition.

4. A composition as recited in claim 1, wherein the polyethylene glycol is present at a concentration of one gallon per two and one-half gallons of composition.

5. A composition as recited in claim 1, wherein the polyisoprene is present at a concentration of one to 2.2 pounds per two and one-half gallons of water.

6. A composition as recited in claim 1, wherein the polyethylene glycol as a molecular weight of between 190 and 210.

7. A composition as recited in claim 1, wherein the process oil is present at a concentration of one pint per two and one-half gallons of composition.

8. A composition as recited in claim 1, wherein the detergent is present at a concentration of 0.8 to one pint per two and one-half gallons of composition.

9. A composition as recited in claim 1, wherein the sodium bicarbonate is present at a concentration of 0.5 pound per two and one-half gallons of composition.

10. A composition as recited in claim 1, wherein ethyl zymate is added in a small quantity.

11. A process for preparation of a composition for injection into inflatable tires, comprising the steps of:
    (a) First, wetting asbestos fibers with water,
    (b) Second, adding process oil,
    (c) Third, adding detergent,
    (d) Fourth, adding ethylene glycol and polyethylene glycol,
    (e) Fifth, letting mixture stand until temperature has leveled off,
    (f) Sixth, adding sodium bicarbonate, and
    (g) Seventh, adding polyisoprene.

* * * * *